United States Patent
Robinson

(10) Patent No.: US 8,923,401 B2
(45) Date of Patent: Dec. 30, 2014

(54) HYBRID MOTION IMAGE COMPRESSION

(75) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 443 days.

(21) Appl. No.: 13/149,525

(22) Filed: May 31, 2011

(65) Prior Publication Data

US 2012/0307901 A1   Dec. 6, 2012

(51) Int. Cl.
| | |
|---|---|
| H04N 11/02 | (2006.01) |
| H04N 19/51 | (2014.01) |
| H04N 19/527 | (2014.01) |
| H04N 19/85 | (2014.01) |
| H04N 19/46 | (2014.01) |

(52) U.S. Cl.
CPC ... *H04N 19/00745* (2013.01); *H04N 19/00593* (2013.01); *H04N 19/00903* (2013.01); *H04N 19/00545* (2013.01)
USPC .................................................. 375/240.16

(58) Field of Classification Search
CPC .................. H04N 19/00745; H04N 19/00545; H04N 19/00903
USPC ........................................ 375/240.16–240.29
See application file for complete search history.

(56) References Cited

U.S. PATENT DOCUMENTS

| | | | |
|---|---|---|---|
| 5,109,435 A | 4/1992 | Lo et al. | |
| 5,991,444 A | 11/1999 | Burt et al. | |
| 6,738,424 B1 | 5/2004 | Allmen et al. | |
| 7,085,401 B2 | 8/2006 | Averbuch et al. | |
| 7,366,325 B2 | 4/2008 | Fujimura et al. | |
| 7,440,637 B2 | 10/2008 | Schnechner et al. | |
| 7,792,520 B2 | 9/2010 | Sohn et al. | |
| 7,990,422 B2 | 8/2011 | Ahiska et al. | |
| 8,004,570 B2 * | 8/2011 | Saito et al. | 348/208.5 |
| 8,325,799 B2 * | 12/2012 | Chono et al. | 375/240.03 |
| 8,400,619 B1 | 3/2013 | Bachrach et al. | |

(Continued)

FOREIGN PATENT DOCUMENTS

| | | |
|---|---|---|
| DE | 196 15 657 A1 | 8/1997 |
| WO | 03058960 A1 | 7/2003 |
| WO | 2008/072024 A1 | 6/2008 |

OTHER PUBLICATIONS

Wiegand et al.; "Overview of the H.264/AVC Video Coding Standard"; IEEE Transactions on Circuits and Systems for Video Technology; Jul. 1, 2003; pp. 560-576; 13(7); IEEE Service Center; Piscataway, NJ, US.

(Continued)

*Primary Examiner* — Dave Czekaj
*Assistant Examiner* — Leron Beck
(74) *Attorney, Agent, or Firm* — Burns & Levinson LLP; Joseph M. Maraia; Weber Hsiao

(57) ABSTRACT

A system and method for processing images of a scene captured by an imaging platform include a correction processor configured to determine a plurality of coefficients associated with transformations that substantially correct expected inter-frame changes in the images caused by relative motion between the scene and the imaging platform; a transformation processor configured to transform the captured images using the plurality of coefficients and transformations so as to substantially correct said expected inter-frame changes; and a module configured to store the plurality of coefficients in image metadata associated with the images.

17 Claims, 14 Drawing Sheets

(56) References Cited

U.S. PATENT DOCUMENTS

| | | | |
|---|---|---|---|
| 2003/0122862 A1 | 7/2003 | Takaku et al. | |
| 2004/0197014 A1* | 10/2004 | Oohashi | 382/118 |
| 2005/0158023 A1 | 7/2005 | Takasu et al. | |
| 2005/0162701 A1 | 7/2005 | Hirano | |
| 2006/0045311 A1 | 3/2006 | Shibuya | |
| 2007/0071296 A1 | 3/2007 | Nonaka et al. | |
| 2008/0063355 A1 | 3/2008 | Nakano | |
| 2008/0273751 A1 | 11/2008 | Yuan et al. | |
| 2009/0136023 A1* | 5/2009 | Pan et al. | 380/28 |
| 2010/0014709 A1 | 1/2010 | Wheeler et al. | |
| 2010/0073519 A1* | 3/2010 | Onoe et al. | 348/231.99 |
| 2010/0097444 A1 | 4/2010 | Lablans | |
| 2010/0100835 A1* | 4/2010 | Klaric et al. | 715/765 |
| 2010/0265364 A1 | 10/2010 | Robinson et al. | |
| 2012/0098933 A1 | 4/2012 | Robinson et al. | |
| 2012/0320237 A1 | 12/2012 | Liu et al. | |

OTHER PUBLICATIONS

Creech; "NGA Approaches to Wide Area Motion Imagery"; National Geospatial-Intelligence Agency; pp. 1-21; [Approved for Public Release 11-146][AIE Eastern FMV Conference][Feb. 28, 2011-Mar. 2, 2011].

Heller; "From Video to Knowledge"; Lawrence Livermore National Laboratory; pp. 4-11 (2011).

Nadernejad et al.; "Edge Detection Techniques: Evaluations and Comparisons"; Applied Mathematical Sciences; 2 (31):1507-1520 (2008).

Seitz et al.; "A Comparison and Evaluation of Multi-View Stereo Reconstruction Algorithms"; Proceedings of the 2006 IEEE Computer Society Conference on Computer Vision and Pattern Recognition; vol. 1—8 pages (2006).

Singh; "Performance Analysis for Objective Methods of Video Quality Assessment"; 9 pages; [Printed online: Oct. 24, 2010 at http://www.eetimes.com/General/DisplayPrintViewContent?contentItemId=4196911; Published Oct. 18, 2005].

Sullivan et al.; "The H264/AVC Advanced Video Coding Standard: Overview and Introduction to the Fidelity Range Extensions"; SPIE Conference on Applications of Digital Image Processing XXVII; pp. 1-22 (2004).

Anandan et al., "Video as an image data source: efficient representations and applications," Proceedings of the International Conference on Image Processing (ICIP), Washington, Oct. 23-26, 1995; IEEE Comp.Soc.Press, US vol. 1, pp. 318-321.

\* cited by examiner

HYBRID MOTION IMAGE COMPRESSION

BACKGROUND

This present disclosure relates to an image processing system and methods.

In various applications, it is desirable to collect persistent video (i.e., multiple image sequences) of a target from a moving imaging platform (e.g., airborne or space-based) that can easily be viewed, and/or interpreted, via displays. This may be especially important for military personnel, and/or for other persons, using portable devices that may have limited processing capabilities. Existing persistent video sensors generally stay fixed to (or focus on) a single point, for instance, on the ground, while the moving imaging platform is in motion. The moving imaging platform captures the images and transmits them to a desired location over a transmission channel.

The ability to accurately replicate a stream of images collected by the moving imaging platform is generally limited by the bandwidth of the transmission channel. For example, airborne and space based imaging platforms can typically collect gigabits per second of imagery, while the bandwidth of the transmission channel is generally limited to megabits per second.

In order to facilitate the transmission of imagery collected by the moving imaging platform, the stream of images may be compressed to reduce irrelevance and redundancy in the image data. The compressed stream of images is transmitted over the communication channel and, then, decompressed to recreate the original stream of images. However, existing compression-decompression systems may introduce compression errors. Furthermore, they may not recreate the original imagery with great efficiency.

SUMMARY

In one embodiment, there is provided a system for processing images of a scene captured by an imaging platform, the system comprising: a correction processor configured to determine a plurality of coefficients associated with transformations that substantially correct expected inter-frame changes in the images caused by relative motion between the scene and the imaging platform; a transformation processor configured to transform the captured images using the plurality of coefficients and transformations so as to substantially correct the expected inter-frame changes; and a module configured to store the plurality of coefficients in image metadata associated with the images.

In another embodiment, there is provided a method for processing images of a scene captured by an imaging platform, the method comprising: determining a plurality of coefficients associated with transformations that substantially correct expected inter-frame changes in the images caused by relative motion between the scene and the imaging platform; transforming the captured images using the plurality of coefficients and transformations so as to substantially correct the expected inter-frame changes; and storing the plurality of coefficients in image metadata associated with the images.

In yet another embodiment, there is provided a method for processing images of a scene captured by an imaging platform, the method comprising: determining a plurality of coefficients associated with transformations that substantially correct expected inter-frame changes in the images caused by relative motion between the scene and the imaging platform; transforming the captured images using the plurality of coefficients and transformations so as to substantially correct said expected inter-frame changes; storing the plurality of coefficients in a file associated with said images, and transmitting the transformed images and file to a compression-decompression system.

In another embodiment, there is provided an article of manufacture comprising a physical, non-transitory computer readable medium encoded with machine executable instructions for performing a method for processing images of a scene captured by an imaging platform, the method comprising: determining a plurality of coefficients associated with transformations that substantially correct expected inter-frame changes in the images caused by relative motion between the scene and the imaging platform; transforming the captured images using the plurality of coefficients and transformations so as to substantially correct the expected inter-frame changes; storing the plurality of coefficients in a file associated with the images, and transmitting the transformed images and file to a compression-decompression system These and other embodiments, features, and characteristics of the present disclosure, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood that the drawings are for the purpose of illustration and description only and are not a limitation of the disclosure. In addition, it should be appreciated that structural features shown or described in any one embodiment herein can be used in other embodiments as well. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

DETAILED DESCRIPTION

According to one or more embodiments, there is provided a method and a system for processing a stream of images and transforming the stream of images into a form that facilitates superior compression, reduced errors and improved efficiency using existing compression-decompression systems including, for example, MPEG-2, MPEG-4, MPEG-4/H.264, Cinepak or any existing compression-decompression systems that exploit the temporal redundancy of sequential images as part of the compression. In one or more embodiments, the transformations of the stream of images are field-wide and can be stored in the image metadata or other location (s) using various coefficients per image frame.

Various embodiments will be described in connection with the acquisition and transmission of a stream of images by a moving imaging platform. The moving imaging platform may be, for example, an airborne or space based platform. However, this is not limiting. It is contemplated that the system and method according to one or more embodiments could be implemented to process and transform images other than those acquired by a moving imaging platform.

The motion of a moving platform may cause changes in scale, perspective (e.g. parallax), rotation, and/or other changes in viewing geometry. These changes may significantly increase the amount of data collected by the moving imaging platform. Furthermore, these changes may severally degrade the ability of existing compression-decompression systems to efficiently compress and decompress images.

Figure 1A:
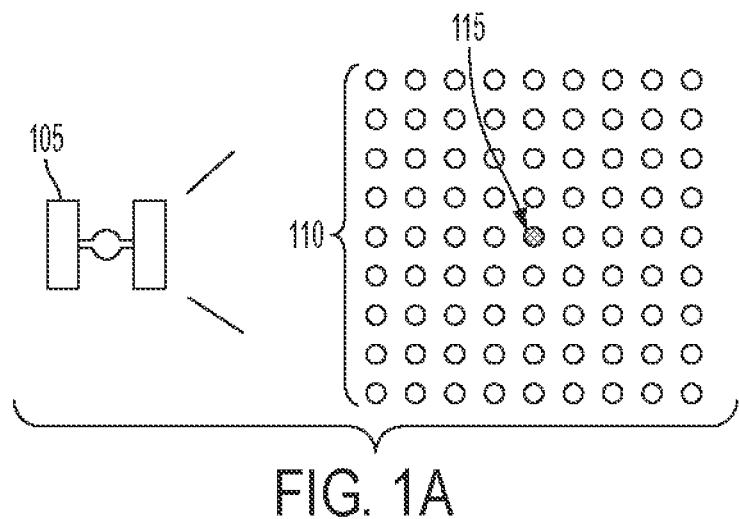
FIG. 1A shows an imaging platform and its initial field of view.

For example, referring to FIG. 1A, this figure shows an imaging platform 105 (in this case, a satellite), having an initial field of view 110, capturing images while gazing at a staring point or target 115. An initial image is sensed at initial detector points (e.g., pixels) (shown as open circles). However, in a subsequent image, the field of view of imaging platform 105 may change due to relative movement between the scene and imaging platform 105.

Figure 1B:
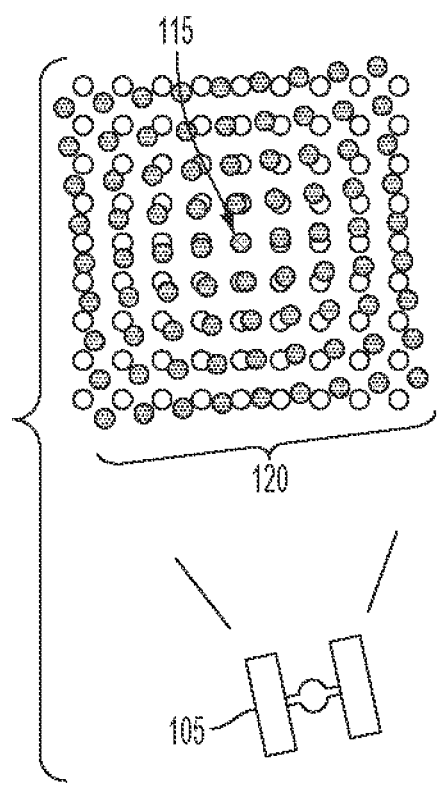
FIG. 1B shows distortion between the initial field of view and a subsequent field of view.

FIG. 1B shows that due to the motion of imaging platform 105, a subsequent field of view 120 is no longer coextensive with initial field of view 110 in a later image capture. For instance, while it is possible to align (center) staring point 115, the detector points (shown as darkened circles) are shifted with respect to the initial detector points. As a result, an image, or a composite image formed by combining images, may be blurred.

Figure 2A:
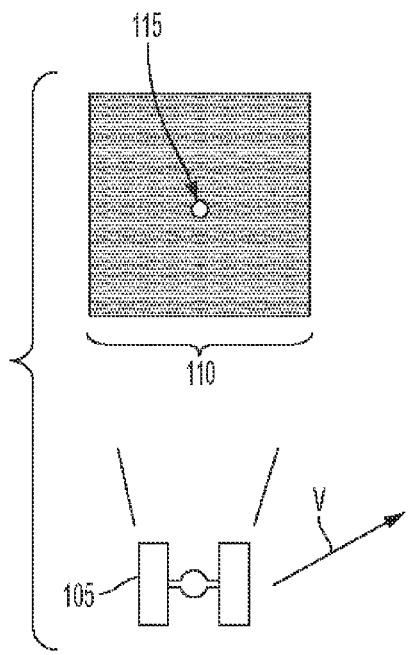
FIG. 2A shows an imaging platform and its initial field of view about a staring point.
Figure 2B:
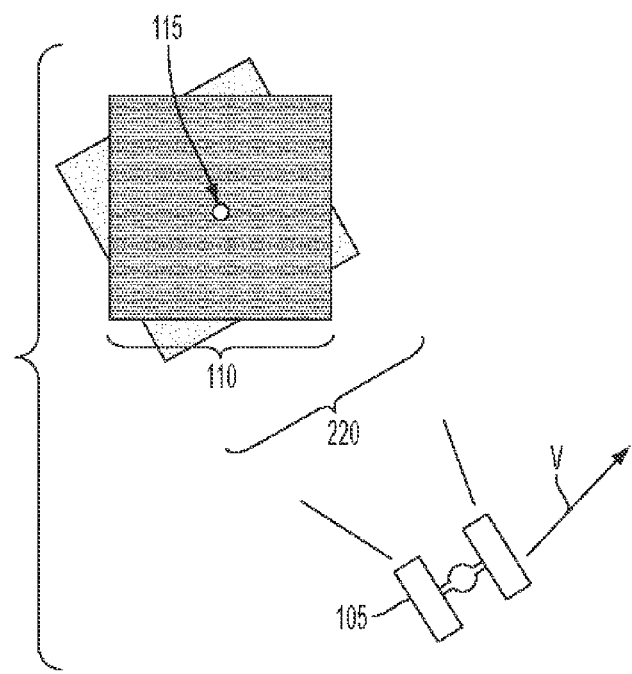
FIG. 2B shows a subsequent field of view due to rotation of the imaging platform about the staring point.

FIGS. 2A-5C show examples of physical motions which may cause image distortion. FIG. 2A, for example, shows initial field of view 110 as imaging platform 105 rotates about staring point 115 with velocity V. FIG. 2B shows a rotational distortion of subsequent field of view 220 due to the rotation.

Figure 3A:
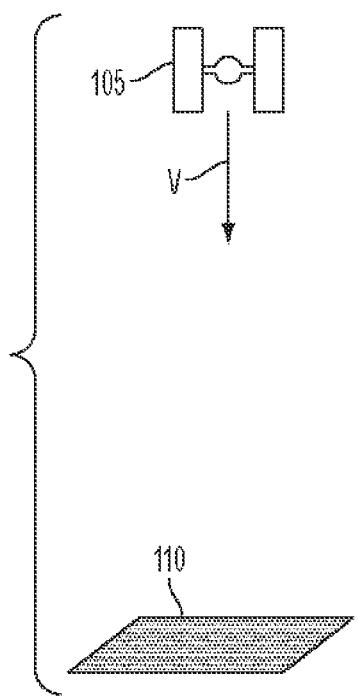
FIG. 3A shows an imaging platform and its initial field of view.
Figure 3B:
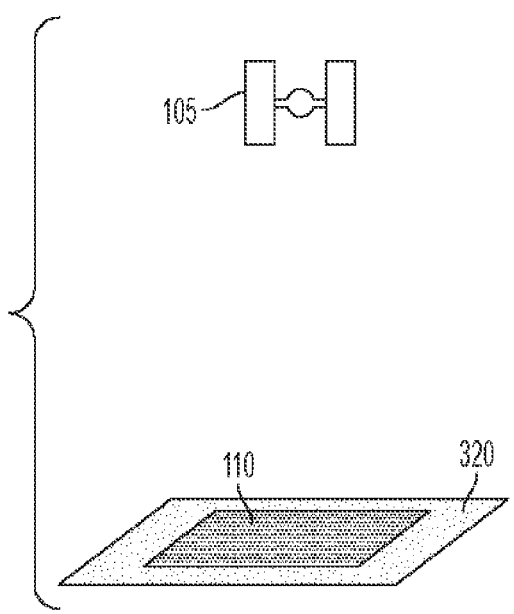
FIG. 3B shows a change in scale of a subsequent field of view of the imaging platform due to movement of the imaging platform directly toward the area being imaged.

FIG. 3A shows initial field of view 110 as the altitude of imaging platform 105 is reduced. FIG. 3B shows a scale distortion of subsequent field of view 320. In this example, the change in scale is equal in both the horizontal and vertical directions since imaging platform 105 moves directly toward field of view 110. However, in general, the change in scale may be different along each axis. Changes in scale of the field of view also result in changes in the mapping of individual image pixels to the scene.

Figure 4A:
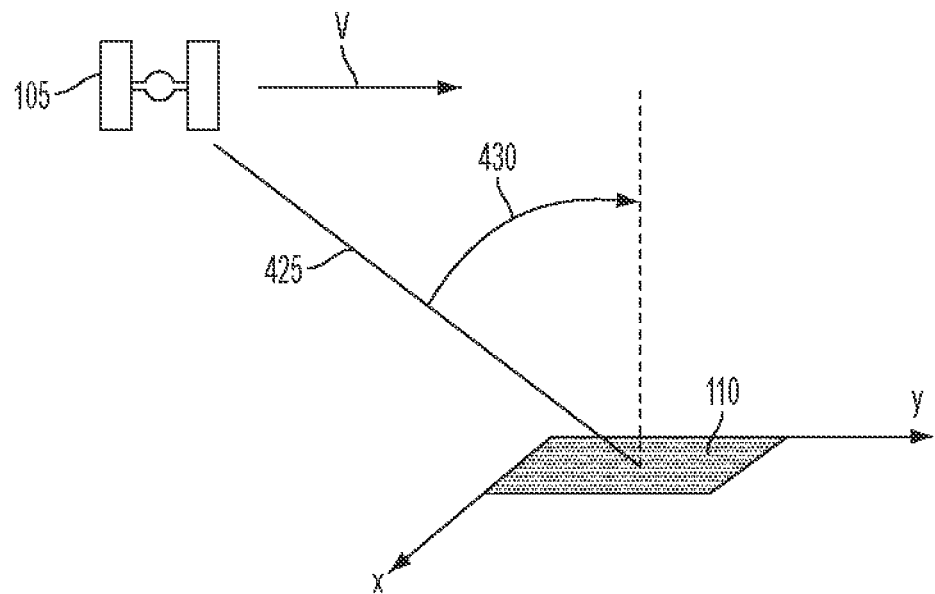
FIG. 4A shows an imaging platform as both its altitude and angle from the zenith is reduced.
Figure 4B:
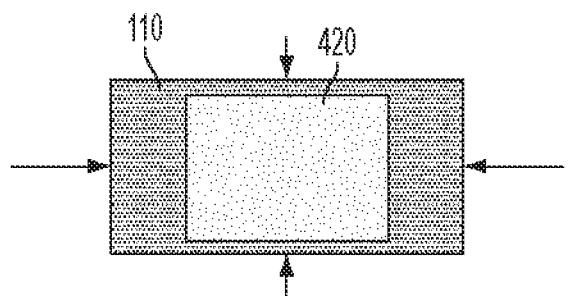
FIG. 4B shows a subsequent field of view scaled in both the X and Y-directions due to the reduction in altitude and zenith angle.

FIG. 4A shows imaging platform 105 approaching both the zenith and the area being imaged. FIG. 4B shows an anamorphic scale distortion of subsequent field of view 420. In particular, subsequent field of view 420 is scaled in both the X and Y directions due to the reduction in altitude of imaging platform 105. Further, subsequent field of view 420 is scaled in the Y-direction more than in the X-direction because line-of-sight 425 remains perpendicular to the X-axis while angle 430 changes with respect to the Y-axis due to the change in zenith angle.

Figure 5A:
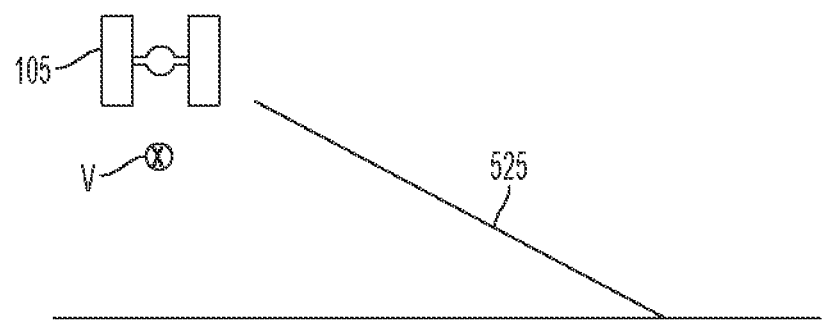
FIG. 5A shows an imaging platform as it approaches the reader in a direction perpendicular to the plane of the page.
Figure 5B:
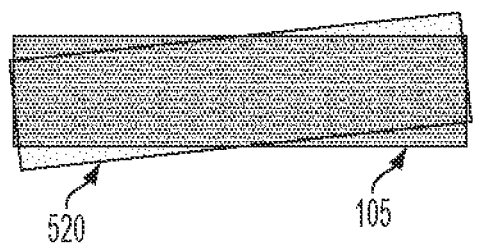
FIG. 5B shows a subsequent field of view due to skew.
Figure 5C:
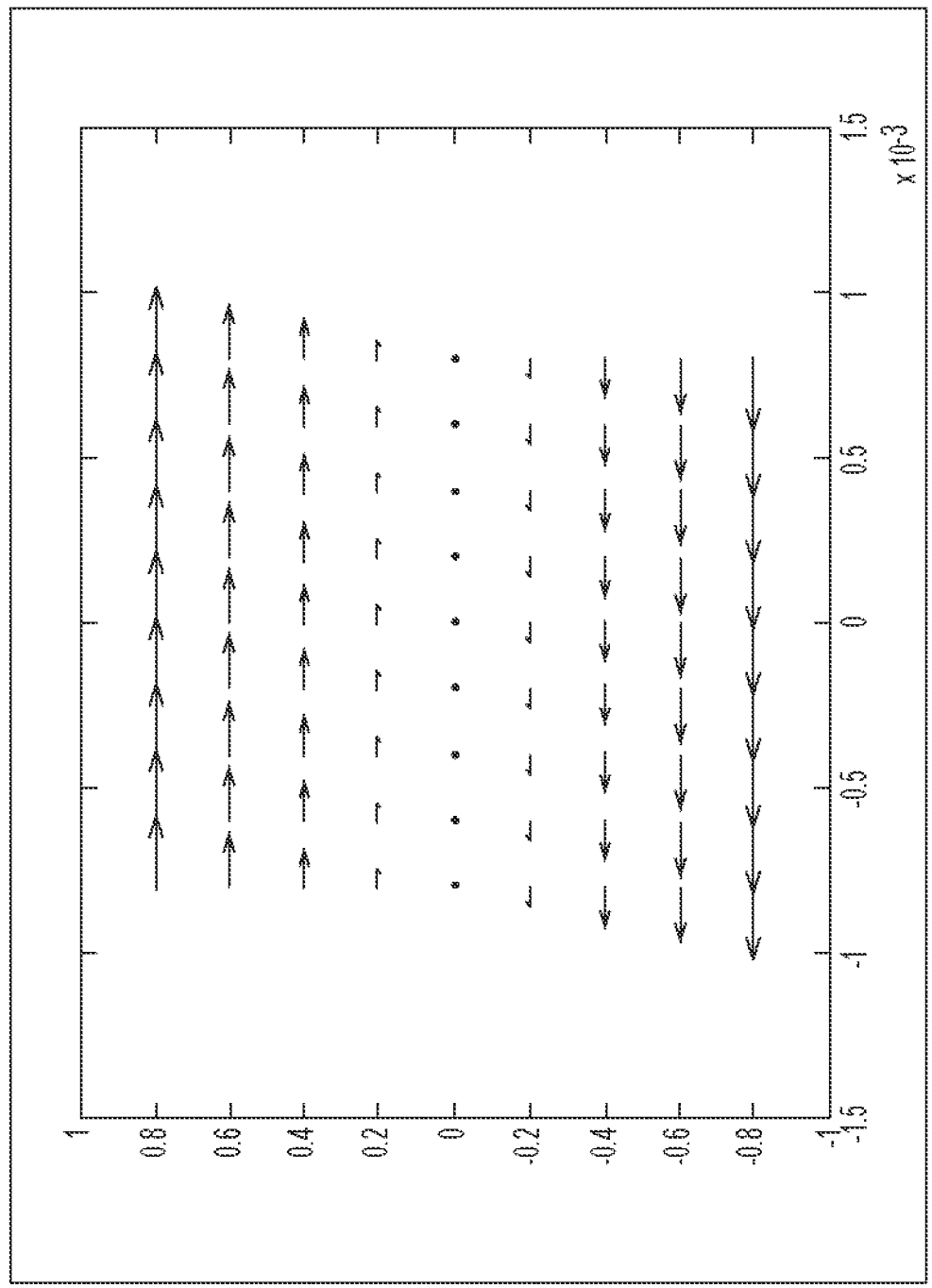
FIG. 5C shows an alternative depiction of skew as a vector field.

FIG. 5A shows imaging platform 105 having line-of-sight 525 moving with velocity V (i.e., approaches the reader in a direction perpendicular to the plane of the page). FIG. 5B shows initial field of view 105 and subsequent field of view 520 caused by skew distortion. Further, FIG. 5C shows an alternative depiction of skew as a vector field. The length of the vector corresponds to magnitude of the displacement from the line of site.

While staring points or target 115 and/or the scene acquired by imaging platform 105 may not be moving in FIGS. 1A-5C, they nonetheless appear to change and/or move because of the relative movement between them and imaging platform 105. This greatly complicates and/or degrades the ability to compress the collected data/images. Indeed, existing compression algorithms achieve high inter-frame compression rates by removing redundant data between frames. Redundant data include, for example, objects that do not move from frame-to-frame. However, because non-moving objects now appear to move and/or change from frame-to-frame due to the relative movement between them and imaging platform 105, the ability to achieve high inter-frame compression may be severely degraded.

Figure 6:
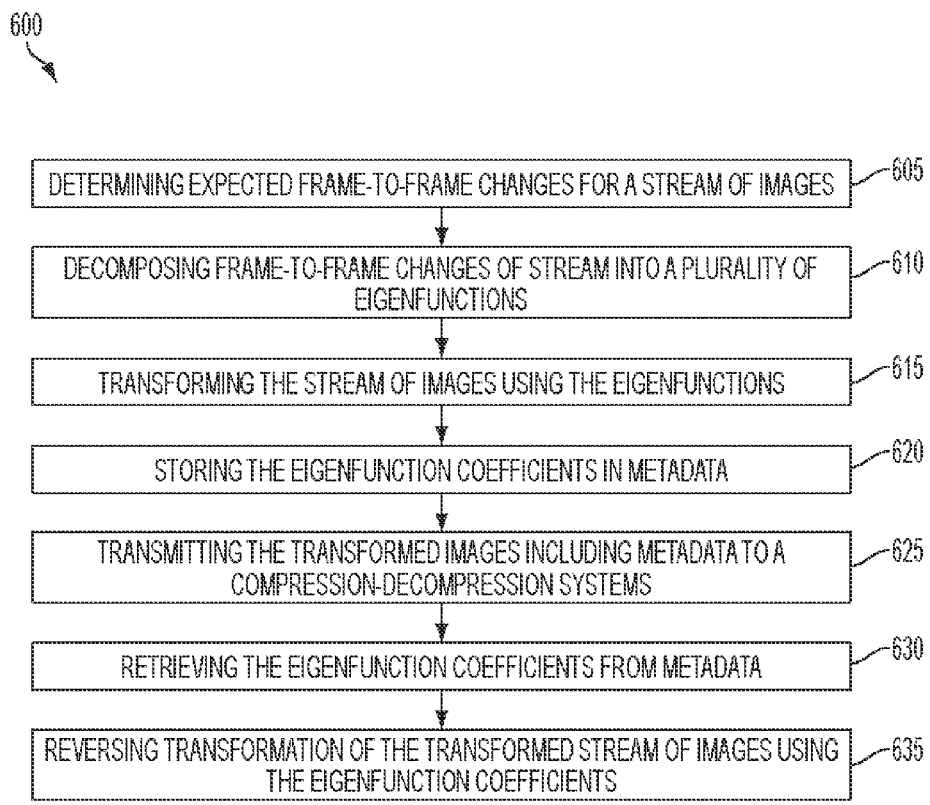
FIG. 6 shows a method 600 for processing a stream of images in accordance with one embodiment.

Referring to FIG. 6, this figure shows a method 600 for processing a stream of images in accordance with one embodiment. The stream of images may be collected by an airborne or space based moving platform. At an operation 605, the expected frame-to-frame or inter-frame changes are determined for the stream of images. As used herein, "inter-frame" refers to aspects between multiple (e.g., two or more) image frames, also referred to as "frame-to-frame." On the other hand, "intra-frame" refers to aspects within a single image frame. In one embodiment, the moving platform trajectory and the sensor viewing geometry of the moving platform, which are known and/or collectable data, can be used to determine and/or calculate the nature and degree of change between consecutive frames, i.e. the expected inter-frame changes, resulting from the relative movement of the moving platform 105 and the scenery. This is done at a pixel level.

Figure 7A:
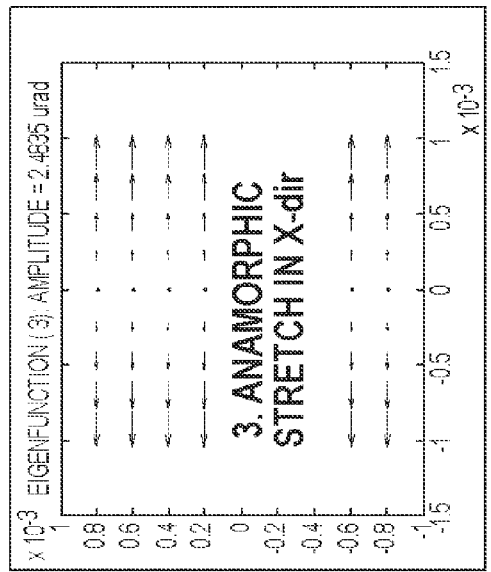
FIGS. 7A-D show four eigenfunctions that mathematically describe the inter-frame changes in the stream of images in accordance with one embodiment.
Figure 7B:
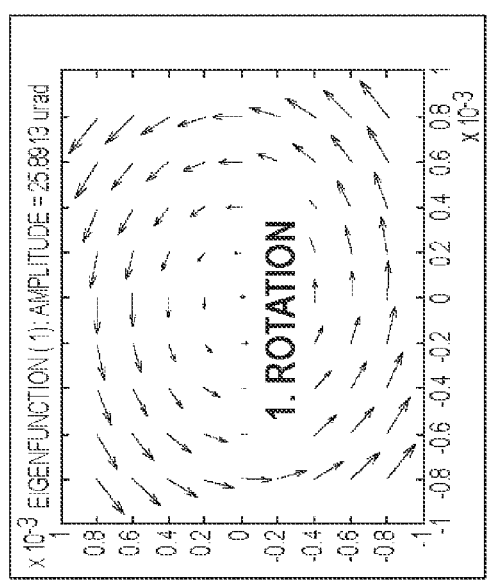
Figure 7C:
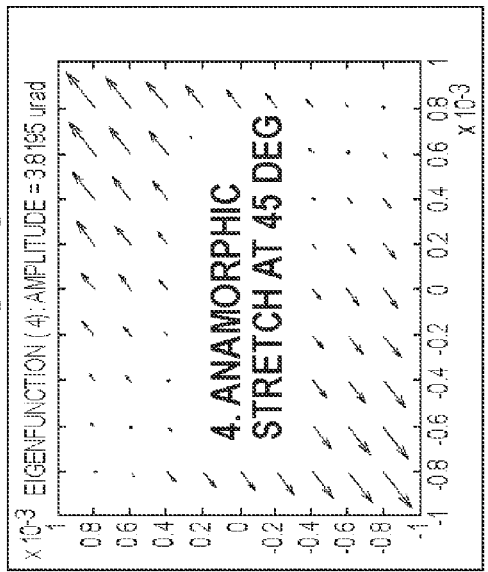
Figure 7D:
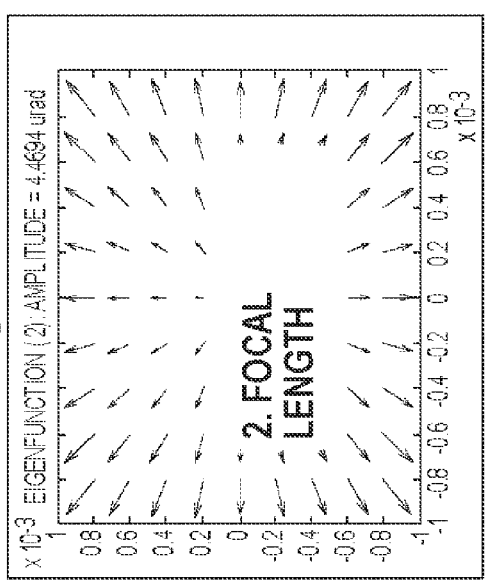

After determining the changes that occur between consecutive frames, method 600 proceeds to an operation 610 where the inter-frame changes are described using the arithmetic combination of a plurality of a priori eigenfunctions. As known in the art, eigenfunctions are dimensional functions and may include Zernike polynomials. In one embodiment, the eigenfunctions are utilized to mathematically describe the expected inter-frame changes over the entire image due to the movement of imaging platform 105 and/or the sensor relative to target 115 in a scene. In one embodiment, the inter-frame changes at a pixel level are mathematically described using 4 a priori eigenfunctions including: one eigenfunction that describes the rotational inter-frame changes (see FIG. 7A); one eigenfunction that describes the inter-frame focal length changes (see FIG. 7B); one eigenfunction that describes the inter-frame anamorphic stretch in one direction (for example the X-direction) (see FIG. 7C); and one eigenfunction that describes the inter-frame anamorphic stretch at 45 degrees (see FIG. 7D).

It will be appreciated that embodiments herein are not limited to the use of the above four (4) a priori eigenfunctions. In one or more embodiments, it is encompassed that the expected inter-frame changes resulting from the relative movement between moving platform 105 and target 115 could be decomposed using more, or less, than four (4) eigenfunctions. Furthermore, it is contemplated that the inter-frame changes could be decomposed with eigenfunctions other than those shown in FIGS. 7A-D. In one embodiment, it is also envisioned to utilize different eigenfunctions and/or to vary the number of eigenfunctions from frame-to-frame.

In one embodiment, the degree of changes at pixel level from one frame to a consecutive frame is characterized by the coefficient(s) of each of the four eigenfunctions. As a result, a set of coefficients (e.g. four (4)) will be associated for each inter-frame change. The coefficient of an eigenfunction relates to the amplitude of the arrows in FIGS. 7A-D. It will be appreciated that if the changes differ from frame-to-frame, the coefficient of each of the four eigenfunctions will also differ from frame-to-frame. For example, if the degree of rotation of the pixels from a first frame to a second frame is greater than the degree of rotation of the pixels from the second frame to a third frame, the coefficient of the eigenfunction that mathematically describes the rotational change for the first inter-frame change will also differ from that that describes the rotational change for the second inter-frame change.

After determining the set of eigenfunction coefficients for the expected inter-frame changes, method 600 proceeds to an operation 615 where the stream of images are transformed using the eigenfunctions and associated coefficients determined at operation 600. The transformations performed on the stream of images at operation 615 remove changes in images due to platform motion such that each frame appears to be collected from a fixed or non-moving vantage point.

Figure 8A:
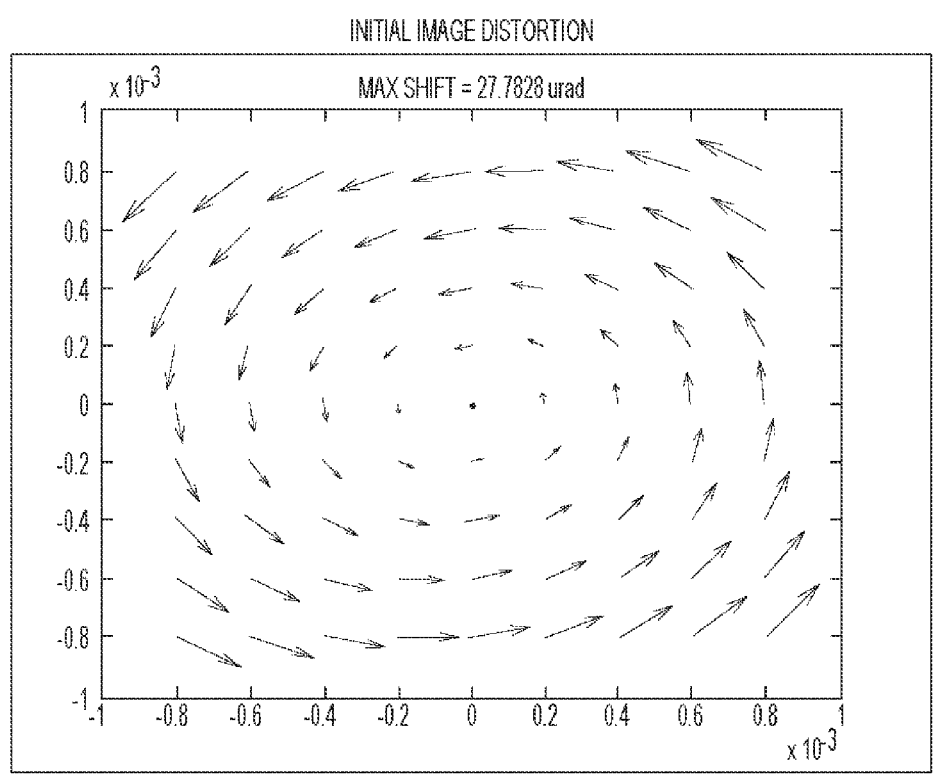
FIGS. 8A-E show an example of transformations on an image using the four eigenfunctions of FIGS. 7A-D in accordance with one embodiment.
Figure 8B:
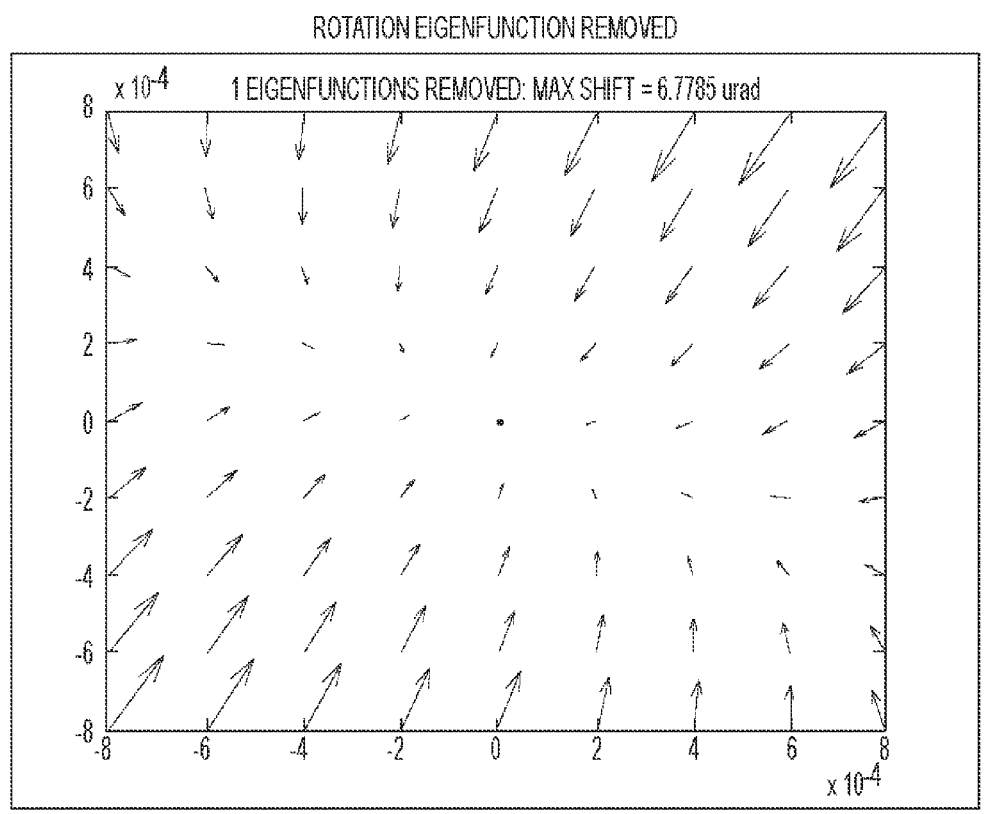
Figure 8C:
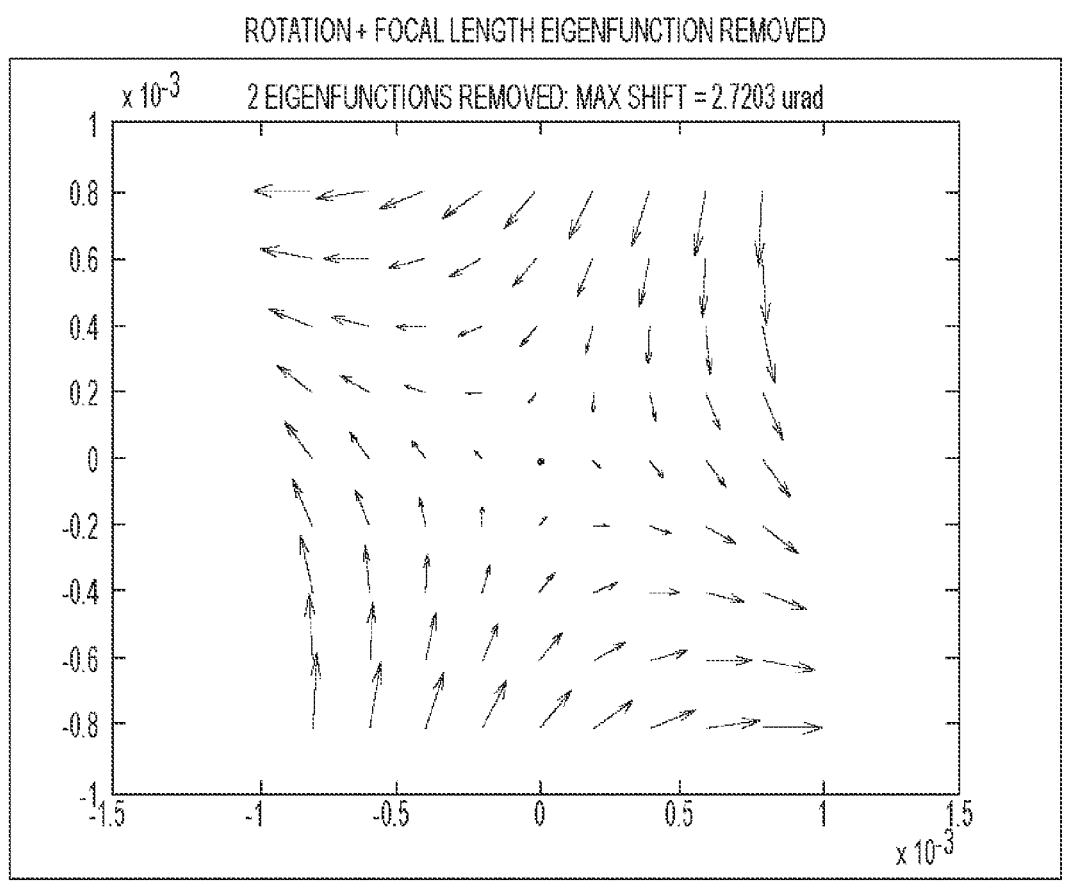
Figure 8D:
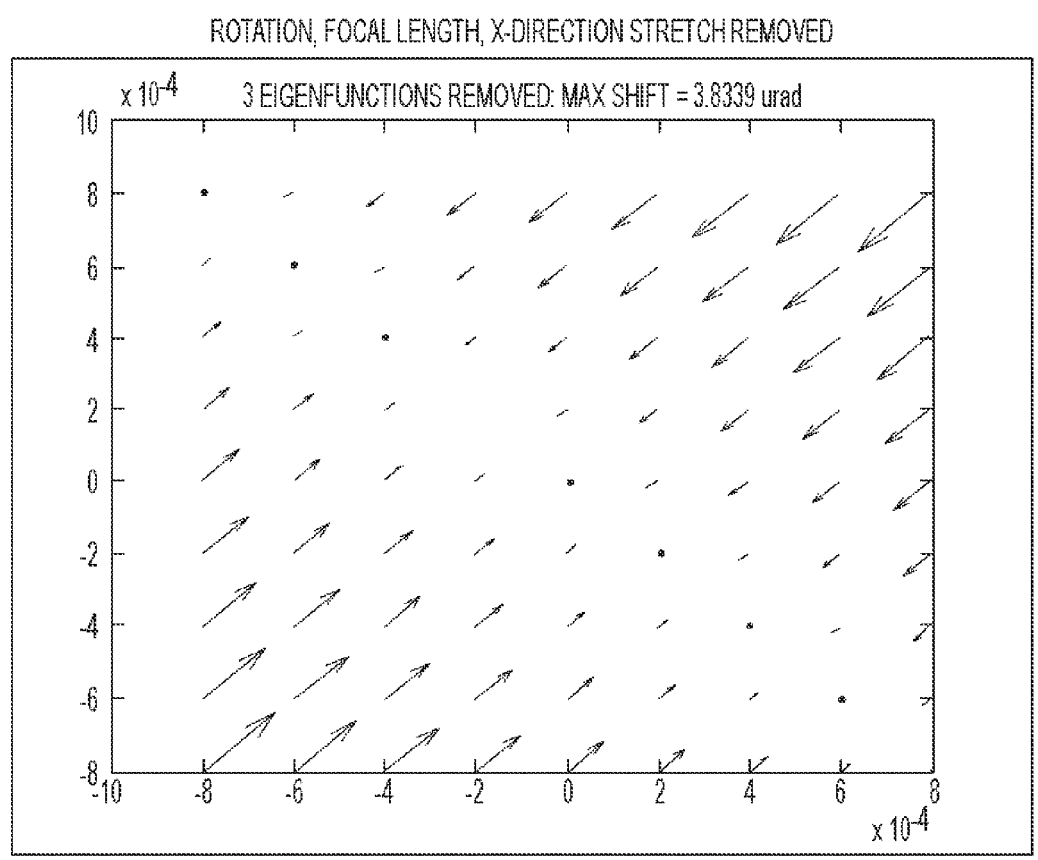
Figure 8E:
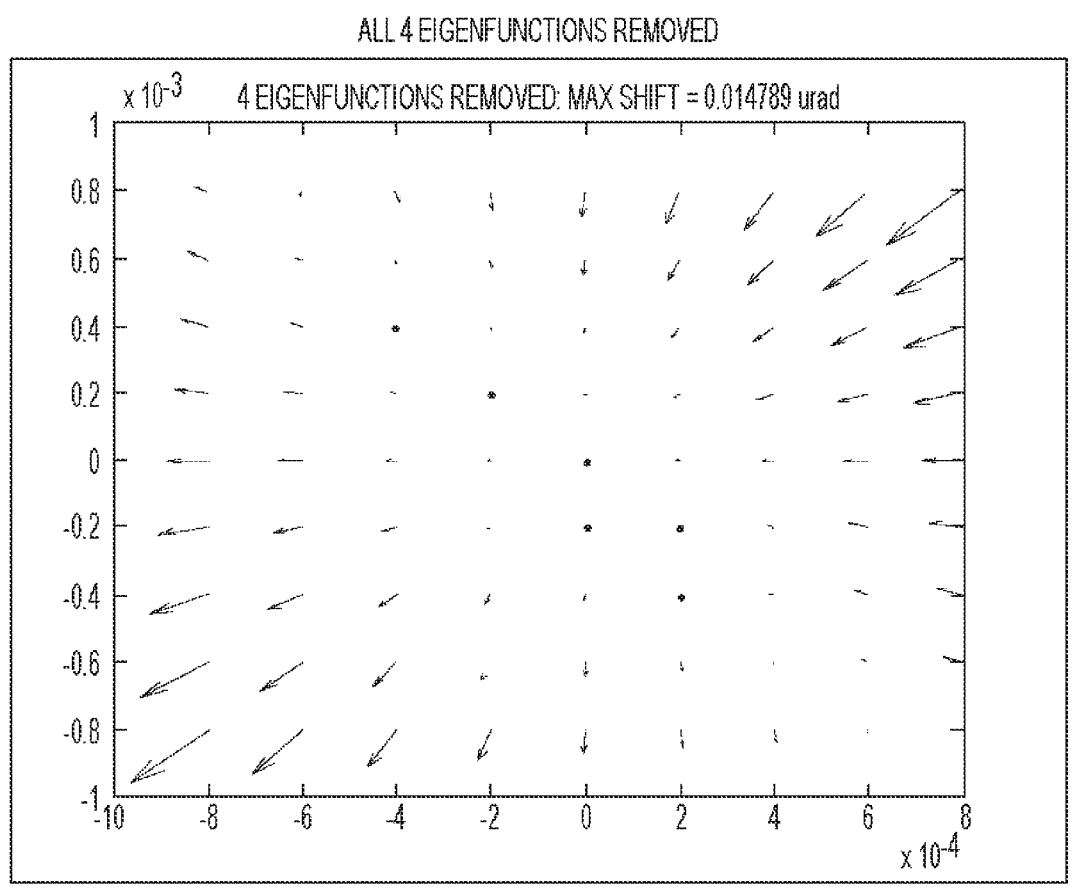

An example of a transformation performed at operation 615 can be seen with reference to FIGS. 8A-E. FIG. 8A shows an initial image distortion that results from a moving platform. Using the eigenfunctions and associated coefficients determined at operation 610, it is possible to remove the expected rotational, focal length, x-direction stretch and anamorphic stretch in the image that results from the relative movement of the platform and the target at the scene. For example, FIG. 8B shows the image after transformation using the eigenfunction that describes the expected rotational change. FIG. 8C shows the image after transformation using the eigenfunctions that describe the expected rotational change and expected focal length change. FIG. 8D shows the image after transformation using the eigenfunctions that describe the expected rotational change, expected focal length change and expected X-direction stretch. FIG. 8E shows the final transformed image after transformation using the eigenfunctions that describe the expected rotational change, expected focal length change, expected X-direction stretch and expected anamorphic stretch at 45° change.

Referring back to FIG. 6, at an operation 620, in one embodiment, prior to compressing the transformed image, the eigenfunction coefficients that describe the degree of each eigenfunction's inter-frame changes are stored in the image metadata. As known in the art, metadata are data that provide information about one or more aspects of data. In the context of image data, metadata are data that are related to the image but are not the image. Examples of metadata in the context of image data include camera settings, navigational information of the platform and/or selection modes of the sensor and/or cameras embedded in the moving platform. Metadata are associated with the stream of images collected by the moving platform.

In one or more embodiments, the eigenfunction coefficients could be stored at a location other than the image metadata. For example, the eigenfunction coefficients may be stored in a separate file that is associated with the images.

At an operation 625, the transformed images and image metadata are transmitted to a compression-decompression system, which is designed to compress and decompress the images. The transformed images are compressed first. Then, after compression, the compressed images and image metadata are sent over a communication channel. The communication channel may be a wireless channel or a wired channel (e.g. including optic fibers) or a combination of a wireless and wired channel. After reception, the compressed images may optionally be decompressed. As will be appreciated by one skilled in the art, the communication channel may differ depending on the location of the moving imaging platform, e.g. whether the moving platform is airborne or not.

In one or more embodiments, image metadata or a separate file including the eigenfunction coefficients can be transmitted concurrently with or separately from (e.g. before or after) the transformed images to the compression-decompression system and/or over the communication channel.

In one embodiment, existing compression-decompression systems, such as MPEG-2, MPEG-4, MPEG-4/H.264, Cinepak or any existing compression-decompression system that exploits the temporal redundancy of sequential images as part of the compression, can be used to compress and decompress the transformed images. However, this is not limiting. It is envisioned that other image compression-decompression systems and/or algorithms could be used in other embodiments.

At operation 625, only the transformed images, not the image metadata, are compressed. Furthermore, because the transformed images do not include the inter-frame changes resulting from the platform motion, the compression rate of the transformed images, the reduction in compression errors as well as the efficiency of existing compression algorithms can be significantly increased as compared to images that have not been pre-processed in accordance with operations 605-615. For example, in one embodiment, the compression rate and compression speed of a existing compression algorithm can be increased by a factor of 2 and errors in compression can be significantly reduced.

After decompressing the transformed images, method 600 can optionally proceed to an operation 630, where the eigenfunction coefficients are retrieved from the image metadata, and then to an operation 635, where the transformations of the decompressed images are reversed using the eigenfunctions to recreate the original imagery.

Figure 9:
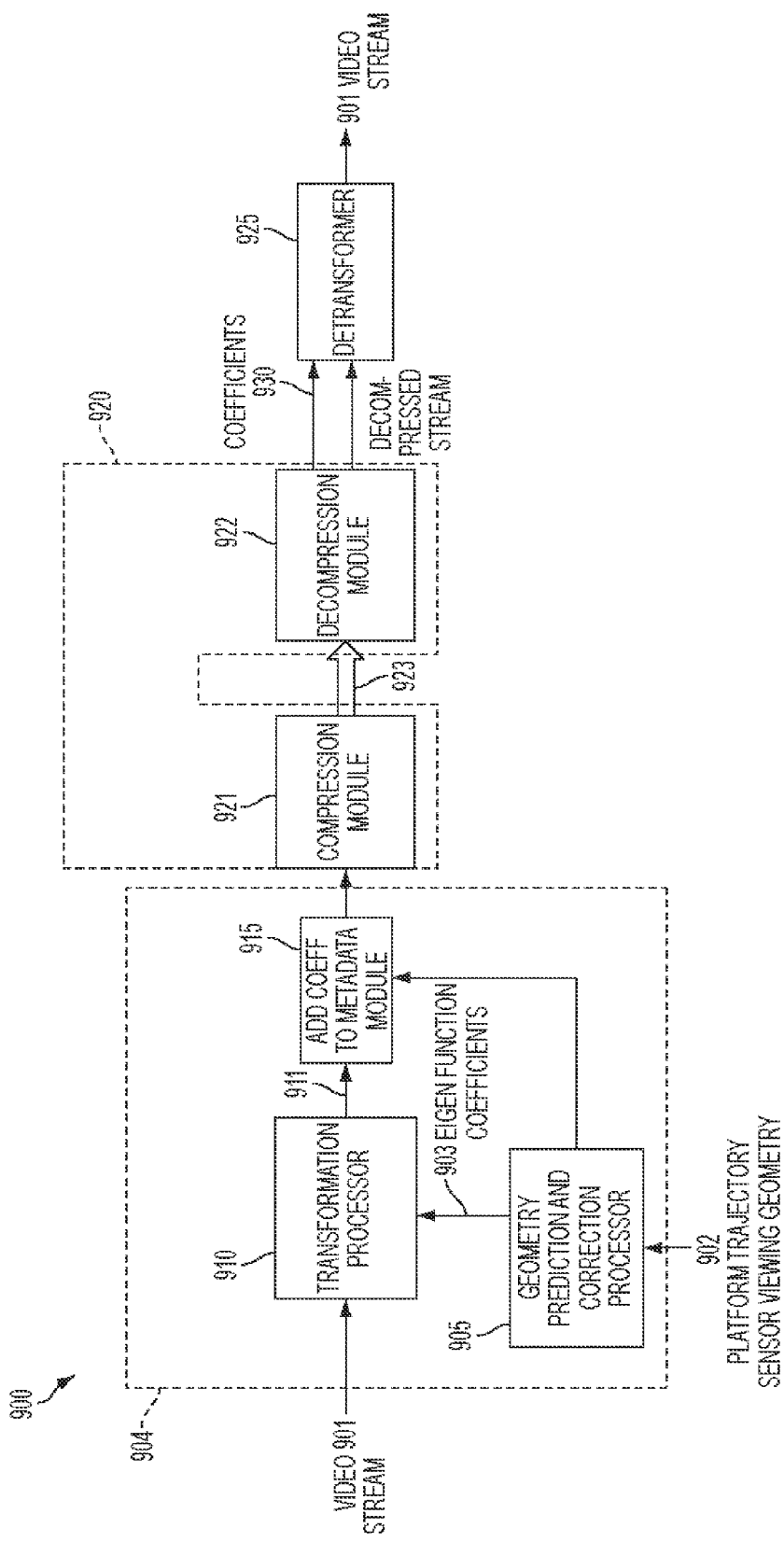
FIG. 9 shows a schematic of a compression system in accordance with one embodiment.

Referring now to FIG. 9, this figure shows a schematic of a system 900 for processing a stream of images 901 in accordance with one embodiment. System 900 generally includes a processor module 904, a compression-decompression system 920 and a detransformer 925. Processor module 904 is adapted to transform stream of images 901 using eigenfunctions in accordance with operations 605-620 described in FIG. 6 and to transmit the transformed images 911 to compression-decompression system 920.

As shown in FIG. 9, the processor module 904 includes a geometry prediction and correction module 905, a transformation processor 910, and an adder or module 915. Processor module 904 receives a stream of images 901 that have been captured by one or more sensors of a moving imaging platform, such as an airborne or space based imaging platform 105 that is configured to collect image frames 901.

Although not shown in FIG. 9, the one or more sensors may be mounted on the moving platform, e.g. moving platform 105, and may include any two-dimensional (2-D) sensor configured to detect electromagnetic radiation (light) corresponding to the entering light of interest and generate image frames, whether still or video image. Exemplary electromagnetic radiation detectors may include complementary metal-oxide-semiconductor (CMOS), charge-coupled device (CCD), or other detectors having sufficient spectral response to detect electromagnetic radiation (light) of interest, for example, in the infrared (IR), visible (VIS), and/or ultraviolet (UV) spectra. In one implementation, the sensor may be a focal plane array (FPA) sensor. Other image sensors may also be used which can provide video and/or still images, including, for example, staring imaging sensors, imaging Fourier transform spectrometers, instruments with two or more angles of view (such as a stereo viewing system), very wide field line scanners, and long dwell Overhead Non-Imaging Infrared (ONIR) and missile warning sensors.

The relative motion between the imaging platform 105 and scene or target 115 can be determined to minimize motion, oscillation, or vibration induced distortions. A variety of sources can provide input data 902 describing the relative motion of imaging platform 105 to the target 115 and viewing geometry of the sensor relative to imaging platform 105.

For example, imaging platform 105 may have a predetermined ground track (e.g., deterministic path) for imaging selected terrain. Accordingly, input data 902 may comprise control data specifying the route and/or trajectory of imaging platform. Input data 902 can also be provided by one or more trajectory sensors (not shown), either alone or in combination with control data, to directly detect the motion of imaging platform 105 or the relative motion between imaging platform 105 and scene or target 115. According to various embodiments, trajectory sensors can include inertial, global positions system (GPS), image processors, velocity (speed), acceleration, etc. They may include mechanical, electro-mechanical, piezoelectric, optical, sensors, radar (ladar) of the like, which are included with the flight systems or avionics of imaging platform 105. Trajectory sensor(s) may be configured to provide various data, including one or more of: velocity (speed), directional heading, and angular heading, for example, of moving imaging platform. Data output from sensors may be configured for Cartesian coordinates, Polar coordinates, cylindrical or spherical coordinates, and/or other reference coordinate frames and systems. In one implementation, the imaging platform may implement a World Geodetic System WGS-84 oblate Earth coordinate frame model. In one implementation, the sensor stares at a fixed point on the earth and collects a sequence of frames.

Processor module 904 is configured to receive image frames 901 from the one or more sensors (and other data gathering devices, such as trajectory sensors or the like) and perform image processing, as discussed herein. Processor module 904 may include hardware, such as Application Specific Integrated Circuits (ASICs), Field Programmable Gate Arrays (FPGAs), digital signal processors (DSPs), or other integrated formats. However, those skilled in the art will recognize that processor module 904 may, in whole or in part, be equivalently implemented in integrated circuits, as one or more computer programs having computer-executable instructions or code running on one or more computers (e.g., as one or more programs running on one or more computer systems), as one or more programs running on one or more processors (e.g., as one or more programs running on one or more microprocessors), as firmware, or as any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer-readable medium, either transitory or non-transitory, used to carry out the distribution.

In some embodiments, processor module 904 may be located on imaging platform 105 and/or with the one or more sensors. The one or more sensors and processor module 904 may communicate and/or share information and data, preferably, in "real-time," via one or more connections and/or networks therebetween. The one or more sensors may transmit image frames, trajectory information, sensor viewing information to processor module 904 by any means (including, for instance, radio, microwave, or other electromagnetic radiation means, optical, electrical, wired or wireless transmissions or the like).

In some instances, a memory device (which may also be referred to as a cache or stack) may temporality or permanently store image frames 901 collected by the one or more sensors for subsequent processing by processor module 904. The memory device may be located, for example, with the one or more sensors or alternatively with the processor module 904.

As shown, processor module 904 includes geometry prediction and correction module 905, transformation processor 910, and adder or module 915. According to various embodiments, the processes described can be implemented with a variety of microprocessors and/or software, for example. In some implementations, one or more modules (of their functionality) may be combined or omitted. Other modules and functions are also possible.

Processor module 904 may be configured to utilize planar, spherical, or oblate earth models, relief or topographic models, 3-D models of man-made objects, and/or terrain elevation maps.

Geometry prediction and correction module 905 is configured to implement operations 605 and 610 shown in FIG. 6. That is, geometry prediction and correction module 905 is configured to determine the nature and degree of distortion between different images 901 collected by the one or more sensors, by receiving input data 902 and determining one or more transformation functions which mathematically describe the distortions due to movement of imaging platform 105 and/or the one or more sensors relative to a target 115. In one embodiment, the transformations are represented by eigenfunctions, such as those shown at FIGS. 7A-D. The geometry prediction and correction module 905 provides for each inter-frame a set of eigenfunction coefficients associated with the eigenfunctions that determine the expected inter-frame changes for the steam of images 901.

Transformation processor 910 receives the modeled transformation data (eigenfunction coefficients) from geometry prediction and correction module 905 and is configured to transform the image frames 901 in accordance with operation 615 of FIG. 6, such that the image frames 901 from the one or more sensors appear as viewed from the same fixed or non-moving imaging platform. In particular, transformation module 910 may be configured to digitally transform successive images 901 of the target with respect to a common field of view (FOV) such that the successive images appear to be viewed from the same non-moving platform. As noted above, the eigenfunctions, which as an ensemble describe approximately all the interframe changes that occur, may comprise rotation, zoom, anamorphic stretch in azimuth (or X-axis of the focal plane assembly), anamorphic stretch at 45° (from X-axis). However, it is envisioned that additional and/or other a priori eigenfunctions could be used in other embodiments. For example, in one embodiment, eigenfunctions representing the anamorphic stretch in elevation (Y-axis), and/or anamorphic stretch at −45° (from X-axis) may be used to transform the images 901. It will be appreciated that the coefficients of the eigenfunctions, which relate to the amplitude of the vectors in FIGS. 7A-D, are determined by the geometry predication and correction module 905, and may change from frame-to-frame.

To maximize the degree of distortion prevention, in some implementations, a best fit of the transformations can be determined according to various methods. For example, the best fit may be calculated using mean-square error (MSE) over the field of view, a measure of error over a portion of the field of view, or by minimizing the maximum error.

In one embodiment, the eigenfunction coefficients 903 determined by the geometry predication and correction module 905 are also stored and/or added in the image metadata associated with images 901 using adder 915. Storage of the coefficients 903 can occur before, concurrently or after transformations of the images 901. Then, after being transformed by transformation processor 910, the transformed images 911 are transmitted to compression-decompression system 920.

Compression-decompression system 920 may be an existing system, including, for example, MPEG-2, MPEG-4, MPEG-4/H.264, Cinepak or any existing compression-decompression system that exploits the temporal redundancy of sequential images as part of the compression, although it is envisioned that other compression-decompression systems could be used in other embodiments. Compression-decompression system 920 includes a compression module 921 that is configured to compress transformed images 911 and a decompression module 922 that is configured to decompress transformed images 911. In one implementation, compression module 921 is arranged within or at close proximity to moving platform 105 and decompression module 922 is arranged at a separate location where the transformed images 901 are decompressed. For example, decompression module 922 may be located at a processing center on earth or in a movable unit (e.g. airplane, vehicle, etc).

As shown, a communication channel 923 is arranged between the compression module 921 and the decompression module 922. In various implementations, the communication channel may be a wireless communication channel or a wired communication channel and/or a combination of a wireless communication channel and a wired communication channel.

In use, transformed images 911 are first compressed by compression module 921 and then transmitted over communication channel 923 along with the image metadata, which includes the eigenfunction coefficients, to decompression module 922. After reception, decompression module 922 decompresses transformed images 911. In the embodiment of FIG. 9, compression module 921 does not compress the image metadata. In one implementation, image metadata are transmitted over communication channel 923 to decompression module 922 concurrently with the compressed images 911. However, this is not limiting. It is envisioned that the eigenfunction coefficients could be transmitted over communication channel 923 separately (e.g. before or after) from the compressed transformed images 911.

System 900 may optionally include a detransformer 925 in communication with decompression module 922. Detransformer 925 is configured to reverse the transformations applied by transformation processor 910 to recreate the original video stream 901. To that effect, detransformer 925 is adapted to receive eigenfunction coefficients 903 and decompressed transformed images 911 from decompression module 922. The detransformer is further configured to retrieve eigenfunction coefficients 903 from the image metadata. In another embodiment, detransformer 925 may receive eigenfunction coefficients 903 from a module other than decompression module 922. Detransformer 925 is adapted to reverse the transformations applied on a frame by frame basis using the same eigenfunctions of geometry prediction and correction processor 902 and eigenfunction coefficients 903.

In one embodiment, it is envisioned to store and/or add eigenfunction coefficients 903 at a location other than the image metadata. For example, eigenfunction coefficients 903 could be stored and/or added in a separate file by processor module 924. The file including eigenfunction coefficients 903 may then be sent over communication channel 923 before or after compressing transformed images 911 or concurrently with transformed images 911.

Furthermore, it will be appreciated that the transformations, compression, decompression and reverse transformations of the images 901 in system 900 could be done in real-time. For example, in one embodiment, images 901 may be transformed using eigenfunction coefficients 903 as transformation processor 910 receives images 901.

It will be appreciated that the different operations involved in processing the images 901 may be executed by hardware, software or a combination of hardware and software. Software may include machine executable instructions or codes. These machine executable instructions may be embedded in a data storage medium of the processor module 904.

The software code may be executable by a general-purpose computer. In operation, the code and possibly the associated data records may be stored within a general-purpose computer platform. At other times, however, the software may be stored at other locations and/or transported for loading into an appropriate general-purpose computer system. Hence, the embodiments discussed above involve one or more software or computer products in the form of one or more modules of code carried by at least one physical, non-transitory, machine-readable medium. Execution of such codes by a processor of the computer system enables the platform to implement the functions in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-transitory non-volatile media, volatile media, and transmission media. Non-volatile media include, for example, optical or magnetic disks, such as any of the storage devices in any computer(s) operating as discussed above. Volatile media include dynamic memory, such as the main memory of a computer system. Physical transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read or send programming codes and/or data. Many of these forms of computer readable media may be involved in carrying one or more sequences of one or more instructions to a processor for execution.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for processing images of a scene captured by an airborne or space based imaging platform, the system comprising:
    a correction processor configured to determine a plurality of coefficients associated with a combination of eigenfunctions, including at least any two of an eigenfunction that describes rotational inter-frame changes, an eigenfunction that describes inter-frame focal length changes, an eigenfunction that describes inter-frame anamorphic stretch in one direction, and an eigenfunction that describes inter-frame anamorphic stretch at 45 degrees, the combination of eigenfunctions corrects inter-frame changes in the images that are expected due to induced motion by the airborne or space based imaging platform moving along a trajectory, the plurality of coefficients being determined based on the trajectory and viewing geometry of sensors on the airborne or space based imaging platform;
    a transformation processor configured to transform the captured images using said plurality of coefficients and the combination of eigenfunctions so as to correct said expected inter-frame changes; and
    a module configured to store said plurality of coefficients in image metadata associated with said images.

2. The system of claim 1, wherein said system is in communication with a compression-decompression system that is adapted to receive the transformed images and image metadata and to compress and decompress said transformed images.

3. The system of claim 2, comprising a detransformer in communication with the compression-decompression system and configured to receive the decompressed transformed images and image metadata, said detransformer configured to reverse transformations applied by the transformation processor using said plurality of coefficients added in the image metadata to recreate said images.

4. The system of claim 2, wherein the compression-decompression system is an MPEG-2, MPEG-4, MPEG-4/H.264, or Cinepak system or a compression-decompression system that exploits the temporal redundancy of sequential images as part of the compression.

5. The system of claim 1, wherein said correction processor is configured to correct expected inter-frame changes in the images caused by relative motion between the scene and the imaging platform using four eigenfunctions.

6. The system of claim 1, wherein the expected inter-frame changes in the images are determined based on a relative motion, a viewing geometry, and an exposure period of the imaging platform.

7. A method for processing images of a scene captured by an airborne or space based imaging platform, the method comprising:
    determining, with a correction processor, a plurality of coefficients associated with a combination of eigenfunctions, including at least any two of an eigenfunction that describes rotational inter-frame changes, an eigenfunction that describes inter-frame focal length changes, an eigenfunction that describes inter-frame anamorphic stretch in one direction, and an eigenfunction that describes inter-frame anamorphic stretch at 45 degrees, the combination of eigenfunctions corrects inter-frame changes in the images that are expected due to induced motion by the airborne or space based imaging platform moving along a trajectory, the plurality of coefficients being determined based on the trajectory and viewing geometry of sensors on the airborne or space based imaging platform;
    transforming, with a transformation processor, the captured images using said plurality of coefficients and the combination of eigenfunctions so as to correct said expected inter-frame changes; and
    storing said plurality of coefficients in image metadata associated with said images.

8. The method of claim 7, wherein said determining includes determining the expected inter-frame changes based on a relative motion, a viewing geometry, and an exposure period of the imaging platform.

9. The method of claim 7, wherein said determining includes describing the inter-frame changes using the combination of eigenfunctions.

10. The method of claim 7, comprising compressing said transformed images and transmitting the compressed images and image metadata over a communication channel.

11. The method of claim 10, comprising decompressing the compressed transformed images.

12. The method of claim 11, comprising, after decompressing the compressed transformed images, retrieving said coefficients from image metadata and reversing transformations applied on said captured images using said coefficients to recreate said images.

13. The method of claim 11, wherein compression and decompression of the transformed images are performed using an MPEG-2, MPEG-4, MPEG-4/H.264, or Cinepak system or a compression-decompression system that exploits the temporal redundancy of sequential images as part of the compression.

14. A method for processing images of a scene captured by an airborne or space based imaging platform, the method comprising:
    determining, with a correction processor, a plurality of coefficients associated with a combination of eigenfunctions, including at least any two of an eigenfunction that describes rotational inter-frame changes, an eigenfunction that describes inter-frame focal length changes, an eigenfunction that describes inter-frame anamorphic stretch in one direction, and an eigenfunction that describes inter-frame anamorphic stretch at 45 degrees, the combination of eigenfunctions corrects inter-frame changes in the images that are expected due to induced motion by the airborne or space based imaging platform moving along a trajectory, the plurality of coefficients being determined based on the trajectory and viewing geometry of sensors on the airborne or space based imaging platform;

transforming, with a transformation processor, the captured images using said plurality of coefficients and the combination of eigenfunctions so as to correct said expected inter-frame changes;

storing said plurality of coefficients in a file associated with said images; and transmitting said transformed images and file to a compression-decompression system.

15. The method of claim 14, comprising compressing said transformed images and transmitting said compressed transformed images and said file to a decompression module of said compression-decompression system.

16. The method of claim 15, comprising decompressing said compressed transformed images, retrieving said coefficients from said file, and reversing transformations applied on the captured images using said coefficients to recreate the images.

17. An article of manufacture comprising a physical, non-transitory computer readable medium encoded with machine executable instructions for performing a method for processing images of a scene captured by an airborne or space based imaging platform, the method comprising:

determining a plurality of coefficients associated a combination of eigenfunctions, including at least any two of an eigenfunction that describes rotational inter-frame changes, an eigenfunction that describes inter-frame focal length changes, an eigenfunction that describes inter-frame anamorphic stretch in one direction, and an eigenfunction that describes inter-frame anamorphic stretch at 45 degrees, the combination of eigenfunctions corrects inter-frame changes in the images that are expected due to induced motion by the airborne or space based imaging platform moving along a trajectory, the plurality of coefficients being determined based on the trajectory and viewing geometry of sensors on the airborne or space based imaging platform;

transforming the captured images using said plurality of coefficients and the combination of eigenfunctions so as to correct said expected inter-frame changes;

storing said plurality of coefficients in a file associated with said images; and transmitting said transformed images and file to a compression-decompression system.

* * * * *